March 21, 1950
C. R. SCHAFER
ELECTRIC MOTOR CONTROL DEVICE
Original Filed Feb. 25, 1945
2,501,583
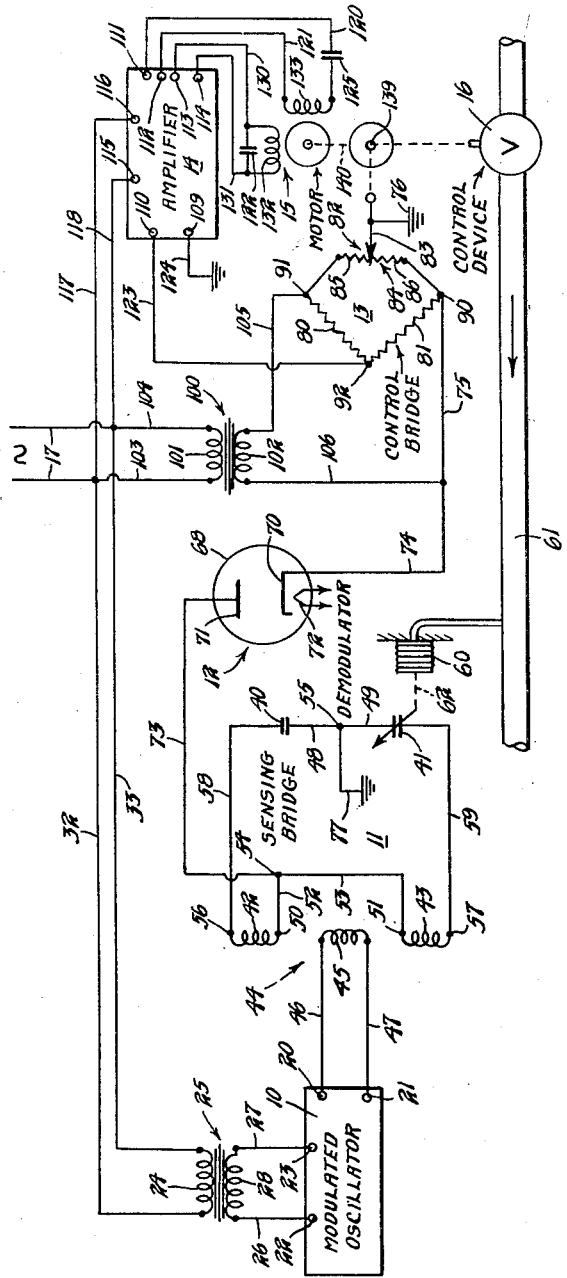
INVENTOR.
CURTISS R. SCHAFER
BY
George H. Fisher
ATTORNEY Patented Mar. 21, 1950

2,501,583

UNITED STATES PATENT OFFICE 2,501,583

ELECTRIC MOTOR CONTROL DEVICE

Curtiss R. Schafer, Rye, N. Y., assignor to Minneapolis-Honeywell Regulator Company, Minneapolis, Minn., a corporation of Delaware Continuation of application Serial No. 579,253, February 25, 1945. This application June 13, 1946, Serial No. 676,400

20 Claims. (Cl. 318—29)

This invention relates to the field of instrumentation, and more particularly to instruments for giving a local or remote indication of change in a condition to be measured.

Instruments of this type are not broadly new, and known instruments of this type can be divided into two general classes. The first class of instrument includes a condition responsive member known as a pickup element and an indicator in the form of a meter, the two being connected by a suitable electric circuit. In this type of instrument there is a continuous electrical output from the pickup device which varies in magnitude with change in the condition to be measured: the indicating instrument is responsive to this change in the magnitude of the signal from the pickup device.

The second broad class of instruments such as that comprising the subject matter of my invention differs from the first class in that the indicator comprises an index movable with respect to a fixed scale by a motor. In this type of instrument, the electrical circuit, generally a form of bridge, is such that it has a normal or balanced position, and any change in the condition to be measured, causing a change in the output of the pickup unit and unbalancing the circuit, results in operation of the motor to change the indication of the index and at the same time return the circuit to its normal or balanced condition.

Of the two types of instruments, the latter type is generally considered more accurate and stable in many applications, operating as it does about a normal condition. The advantages of bridge circuits are well known, and the peculiar insensitiveness of normally balanced bridge circuits to variations in the applied voltage is an added advantage of this type of system.

Pickup units of various kinds have been used in instrumentation systems, but I am convinced that in the long run the most satisfactory condition responsive members are those based on a change in capacitance with change in the condition being supervised, and the pickup unit embodied in my invention is therefore of this class.

A major drawback in the use of capacity or condenser pickups lies in the fact that in instrumentation systems of the second type it is necessary that the motor be energized from a commercial source of alternating current. Conveniently constructed capacity pickups do not operate efficiently in impedance bridges at commercial or low frequencies, and the problem of integrating in a single system the desired low frequency motor rebalancing of a normally balanced bridge circuit with the prefered high frequency energization of the capacity pickup has not heretofore been successfully solved in a simple and economical manner.

It is an object of my invention to provide a satisfactory instrumentation system including a capacity pickup and a motor actuated indicator.

It is another object of my invention to provide means for controlling the operation of a low frequency motor in accordance with change in a high frequency circuit.

A more specific object of my invention is to provide an instrument in which a first normally balanced network or sensing bridge is energized with high frequency alternating current modulated at a power frequency, the bridge unbalance signal being thereafter demodulated and the demodulated signal being used in a second bridge to control the actuation of a motor indicator.

A more limited object of my invention is to provide a balanceable network which is responsively unbalanced by a signal voltage applied across an impedance member of the network, and which is rebalanced by changing the ratio between impedances of further members of the network.

Various other objects, advantages, and features of novelty which characterize my invention are pointed out with particularity in the claims annexed hereto and forming a part hereof. However, for a better understanding of my invention, its advantages, and objects attained by its use, reference should be had to the subjoined drawing, which forms a further part hereof, and to the accompanying descriptive matter, in which I have illustrated and described a preferred embodiment of my invention.

The single figure of the drawing is a schematic wiring diagram of an instrument constructed according to the principles of my invention, and shows a device particularly adapted for the measurement and control of pressure. However, it will be realized that my instrument is equally well adapted to the measurement and control of liquid level, temperature, or any other variable to change in which variation in the capacitance of the capacitor can be related.

Construction

As shown in the drawing, my invention is seen to comprise certain major components including a modulated oscillator 10, a normally balanced network or sensing bridge 11, an asymmetrically conducting member in the form of a detector or demodulator 12, an impedance unit or control bridge 13, an amplifier 14, a motor 15, a control device 16, and a pair of conductors 17 connected to a source of electrical energy in the form of alternating voltage power frequency. The structure and function of these major components, and the electrical circuits combining them into a single operative instrument, will now be considered in further detail.

Since modulated oscillators are well known in the art, I have not shown the detailed structure of member 10, which may be energized from any suitable power supply such as self contained batteries. Member 10 is shown as being provided with a pair of output terminals 20 and 21, and a pair of input terminals 22 and 23 are also provided, to which the low frequency modulating voltage is supplied. This modulating voltage is provided, through a transformer 25 having a primary winding 24 and a secondary winding 26, from conductors 17. One suitable embodiment of an oscillator of this type is illustrated and described on pages 412 and 413 of the 1944 edition of Radio Amateurs' Handbook, published by the American Radio Relay League, Inc., West Hartford, Connecticut. In this particular oscillator the envelope of the output wave is 180° out of phase with the modulating voltage, or in phase with the power frequency because of the phase reversal in transformer 25.

The function of member 10 is to supply electrical energy, at output terminals 20 and 21, in the form of a high frequency carrier voltage modulated at a lower frequency. A carrier frequency of 500 kilocycles per second and a modulating frequency of 400 cycles per second are suggested as serving satisfactorily.

Sensing bridge 11 is shown to comprise a pair of capacitors 40 and 41 and a pair of inductors 42 and 43, the latter comprising electrically identical secondary windings of an air-core transformer 44 having a primary winding 45. Lower terminal 50 of winding 42 and upper terminal 51 of winding 43 are connected to one output terminal 54 of bridge 11 by conductors 52 and 53, respectively. Capacitors 40 and 41 are connected to the other output terminal 55 of bridge 11 by conductors 48 and 49, respectively, and the bridge circuit is completed by conductors 58 and 59, connecting capacitors 40 and 41 with inductors 42 and 43, respectively. The sensing bridge is energized from oscillator 10 by the action of transformer 44: the upper terminal 56 of coil 42 and the lower terminal 57 of coil 43 may be considered the input terminals of the bridge.

The inductances of inductors 42 and 43 and the capacitance of capacitor 40 are fixed, while the capacitance of capacitor 41 is variable. Since the inductances of inductors 42 and 43 are equal, bridge 11 can be in a balanced condition only when the capacitance of variable capacitor 41 is equal to the capacitance of fixed capacitor 40. The circuit constants are chosen so that the capacitance of capacitor 41 is always less than that of capacitor 40. There is always therefore a signal voltage at the output terminals 54 and 55 of the bridge; this voltage has the same form as the input from oscillator 10, and its amplitude depends upon the magnitude of the difference between the capacitances of capacitors 40 and 41.

Capacitor 41 is shown as connected by a link 62 with a bellows 60 which is mechanically responsive to change in the pressure in a conduit 61. The arrangement is such that for any particular pressure in the conduit there is a unique value of capacitance of capacitor 41, and therefore a unique condition of unbalance of bridge 11. If the pressure in conduit 61 increases, bellows 60 expands, increasing the capacitance of capacitor 41, and causing a decrease in the output signal of bridge 11. Similarly, if the pressure in conduit 61 drops below the standard, bellows 60 contracts under the influence of the ambient atmospheric pressure, decreasing the capacitance of capacitor 41 and causing an increase in the output signal of the bridge. It is thus apparent that the sensing bridge functions, in combination with sensing element 60, to give a continuous signal which varies in amplitude with variation in the pressure being measured: the signal is in the form of a periodic voltage having carrier and power frequency components, the former being in 180° phase relation with the power frequency.

Demodulator 12 comprises an electronic rectifier tube 68 acting as a diode detector. The tube includes a cathode 70, a plate 71, and a heater filament 72 suitably energized by conventional means not shown. The function of this demodulator will be given in more detail when the operation of the invention as a whole is set forth: briefly, the demodulator serves to derive from the bridge output voltage a voltage having a principal component of the power frequency, whose amplitude varies with variation in the amplitude of the bridge output voltage.

Control bridge 13 is shown to comprise a pair of fixed resistors 80 and 81, which form adjacent arms of the bridge, and a variable resistor 82 including a slider 83 movable along a winding 84 to divide it into portions 85 and 86: portions 85 and 86 of winding 84 comprise the second pair of adjacent arms of the bridge and are connected to the first pair of adjacent arms at input terminals 90 and 91. Slider 83 of variable resistor 82 and a common terminal 92 between resistors 80 and 81 comprise the output terminals of the control bridge. Bridge 13 is energized from conductors 17 through a transformer 100 having a primary winding 101 and a secondary winding 102: transformer 100 derives from the source a voltage of the power frequency and of fixed amplitude and phase.

Since the resistances of resistors 80 and 81 are equal, control bridge 13 is in its balanced condition when slider 83 is in its zero or central position along resistance winding 84; that is, when the resistances of portions 85 and 86 of winding 84 are equal. Under these conditions, no voltage derived from transformer 100 appears at the output terminals of the control bridge. For all other positions of slider 83 a voltage of the power frequency derived from input transformer 100 appears at the output terminals of the bridge, the magnitude of this voltage varying with the amount of displacement of slider 83 from its zero position and its phase reversing when slider 83 moves from one side of its zero position to the other. In the embodiment of my invention shown in the figure the output voltage is 180° out of phase with the input voltage or in phase with the power frequency source, due to the action of transformer 100, when slider 83 is above its zero position.

A second, independent output voltage can appear at the output terminals of bridge 13. The output of bridge 11 is connected, through demodulator 68, between input terminal 90 and output terminal 93 of bridge 13, and the current in portion 86 of resistor 82 due to this produces a voltage thereacross derived from the unbalance voltage of bridge 11: the derived voltage has an alternating component of the power frequency but of opposite phase whose amplitude varies with the amplitude of the bridge output. Since the derived voltage is applied to bridge 13 asymmetrically, a voltage of the same wave shape but of somewhat reduced amplitude appears at the output terminals of the control bridge if the latter is otherwise balanced, and this voltage is such that its power frequency component, as it appears between terminals 92 and 83 of bridge 13, is in phase with the power frequency source.

A consideration of the preceding paragraphs will make it evident that impedance unit 13 is affected by two different applied periodic voltages, and that these voltages will buck when slider 83 is below its center position and will boost when slider 83 is above its central position. It will also be apparent that it is possible to so select the circuit components that for any reasonable range of unbalance of sensing bridge 11 an equal and opposite unbalance of bridge 13 may be brought about by proper adjustment of slider 83. For any other position of slider 83, one or the other of the bucking voltages predominates, and a bridge output voltage having a component of the power frequency and of reversible phase is thus made available for use as will now be set forth.

Amplifier 14 is shown to comprise a pair of input terminals 109 and 110 and a set of output terminals 111, 112, 113, and 114: a further pair of terminals 115 and 116 is provided by which the amplifier may be energized from conductors 17. The function of amplifier 14 is to provide a first alternating current at output terminals 111 and 112, and a second alternating current at output terminals 113 and 114 in phase quadrature with the first current, the quadrature relation changing from a leading one to a lagging one with reversal in the phase of a signal voltage applied to the amplifier. Electrical energy for one of these currents is derived from conductors 17 directly, while that for the other phase is derived from conductors 17 through a control circuit, included in amplifier 14, which is responsive to the signal applied to the input of the amplifier. It will, of course, be appreciated that this input signal must have a component of the frequency of the source and either substantially in phase with the source or substantially 180 degrees out of phase in order for the device to operate satisfactorily.

Amplifier 14 may be of any one of a number of motor control amplifiers for regulating the direction of operation of a motor in accordance with the phase of a signal impressed on the input of the amplifier: one such amplifier is shown in Anschutz-Kaempfe Patent 1,586,233.

Motor 15 comprises a pair of field windings 132 and 133 so mounted as to be mechanically in quadrature, and a rotor carried by a shaft 140 for rotation with respect to the field windings. In actual practice a larger number of poles may be used in the motor stator. If the windings are energized by alternating currents which themselves are in quadrature, a rotary field is set up within the motor which causes rotation of the armature and with it shaft 140. This method of operation of the motor is familiar to those skilled in this art.

Shaft 140 of motor 15 is mechanically connected with slider 83 through suitable reducing gearing 139, for causing movement of the slider with respect to winding 84. The output of reducing gearing 139 is also connected to a control device 16 which in the illustrated embodiment of my invention comprises a throttle valve regulating the supply of fluid under pressure to conduit 61. Operation of motor 15 is therefore effective to affect the balance of bridge 13 and simultaneously to regulate the pressure within conduit 61.

Transformer 25 is energized from conductors 17 through conductors 32 and 33. Oscillator 10 is energized from the secondary winding of transformer 25 by conductors 26 and 27. Transformer 44 is energized from oscillator 10 by conductors 46 and 47, and energizes sensing bridge 11 by transformer action. Transformer 100 is energized from conductors 17 by conductors 103 and 104. Bridge 13 is energized from the secondary winding of transformer 100 by conductors 105, 106, and 75. Amplifier 14 is energized from conductors 17 through conductors 117 and 118, and the output of bridge 13 is connected to the input of amplifier 14 by conductor 123 and ground connections 76 and 124. Winding 133 of motor 15 is supplied with electrical energy directly from conductors 117 and 118, by conductors 120 and 121, and constitutes the "line" winding of the motor. A capacitor 125 is connected in series with this winding to cause a 90 degrees phase shift between the current flowing in winding 133 and the voltage of the source. Winding 132 of motor 15 is supplied with electrical energy of reversible phase, derived from conductors 117 and 118 under the control of amplifier 14, by conductors 130 and 131, and constitutes the "amplifier" winding of the motor. A capacitor 122 is connected in parallel with this winding and is chosen, with respect to winding 132, so that the parallel circuit is nearly resonant at the power frequency: the exact size of this capacitor is chosen so that the currents in the two motor windings have a 90 degree phase angle.

The output circuit of sensing bridge 11 may be traced from its output terminal 54 through conductor 73, demodulator 68, conductors 74 and 75, input terminal 90 of bridge 13, portion 86 of winding 84, slider 83, and ground connections 76 and 77 to terminal 55 of sensing bridge 11. The demodulated output of sensing bridge 11 is accordingly impressed upon portion 86 of winding 84 of control bridge 13 so that whenever sensing bridge 11 is not balanced an extraneous voltage is unsymmetrically inserted into the control bridge circuit.

Operation

The operation of my invention will now be apparent. Let it first be assumed that slider 83 is at its midpoint. Control bridge 13 is energized from transformer 100, and because of the central location of slider 83 the control bridge is balanced, and no voltage derived from the control bridge is impressed upon the input of amplifier 14. However, sensing bridge 11 is unbalanced, as previously set forth, and an output voltage appears between terminals 54 and 55 of bridge 11. This output voltage is applied to the circuit including demodulator 12 and portion 86 of winding 84. During half cycles of the carrier voltage when plate 71 is negative with respect to cathode 70, no current flows in the circuit just recited, while during the half cycles of the carrier voltage when plate 71 is positive with respect to cathode 70, current flows in the circuit. The current flowing through portion 86 of winding 83 causes a voltage to appear across 86, and this in turn results in the appearance of an output signal between terminal 92 and slider 83 which is accordingly impressed upon the input of amplifier 14. This signal takes the form of the upper half of the modulated carrier wave, whose positive peaks are in phase with those of the voltage energizing bridge 13 and whose envelope has a zero phase angle with the power frequency.

As is well known, an irregular wave form of the type just referred to can be analyzed into a unidirectional component and a number of components of various harmonic frequencies. This particular wave form, in addition to its unidirectional component, has a principal alternating component whose frequency is the same as that of the voltage supplied by conductors 17, with which the component is in phase. Although all of the alternating components of the wave form can be transmitted through amplifier 14, it may be desirable to design amplifier 14 to suppress the higher harmonics to a preferred extent. In any case, motor 15 is especially designed for operation from a source whose frequency is that supplied by conductors 17: components having other frequencies, as well as the unidirectional component, have principally a braking effect on the motor. Although the motor does not run with the speed and efficiency it would show if both windings 132 and 133 were energized directly from conductors 17, the motor does run with somewhat reduced efficiency, and the direction in which the motor runs is such as to move slider 83 in a downward direction.

The efficiency of motor 15 is improved by the provision of capacitor 122 which tunes the parallel circuit more nearly to resonance at the power frequency. The impedance of the parallel circuit to this component of the complex wave is accordingly much higher than its impedance to other components, and a larger proportion of driving energy is absorbed from the selected component than would otherwise be the case.

Movement of slider 83 is effective to accomplish two different functions. In the first place, the resistance in the output circuit of bridge 11 is reduced, thereby reducing the actual value of the voltage drop through this resistance. In the second place, bridge 13 is itself unbalanced so that a second voltage appears between terminal 92 and slider 83: this voltage is out of phase with the principal component of the voltage derived from sensing bridge 11, and therefore reduces the effectiveness of that component in actuating motor 15. Continuous operation of the motor continues to move slider 83 until a position of the slider is reached at which the voltage derived from transformer 100 is just sufficient to counteract the useful component of the voltage derived from bridge 11. When this takes place, operation of motor 15 is interrupted.

At the same time that slider 83 is being moved along winding 84, operation of motor 15 causes valve 16 to be operated, thus varying the supply of fluid under pressure to conduit 61, and changing the pressure in conduit 61. With each increment of change in pressure in conduit 61 a corresponding increment of change in capacitance of capacitor 41 takes place, the voltage in portion 86 of winding 84 due to the rectified output of bridge 11 is incrementally reduced, and the opposing voltage due to displacement of slider 83 from its central position is increased. The unbalance of bridge 13 is accordingly reduced and this condition continues until valve 16 and slider 83 reach settings at which the pressure in conduit 61 is constant, when a condition of balance between the demodulated output of sensing bridge 11 and the unbalance output of control bridge 13 has been reached. No voltage is supplied to amplifier 14 under these conditions, so operation of motor 15 ceases, and the system may be said to be in equilibrium, with bridge 13 in electrical balance and bridge 11 in electrical unbalance.

It will be obvious that an initial rise of the pressure in conduit 61 has an effect on control bridge 13 and therefore on motor 15 opposite to that of a decrease in pressure. The demodulated voltage effective in control bridge 13 varies in magnitude with change in the condition being measured, growing larger when the pressure increases and growing smaller when the pressure decreases. If for any given state of balance of bridge 13 the pressure in conduit 61 changes in a first direction, the voltage derived from sensing bridge 11 is increased as compared with that instantaneously being derived from transformer 102, while if the pressure changes in the opposite direction the voltage derived from sensing bridge 11 decreases as compared with that instantaneously being derived from transformer 102. This results in opposite energization of amplifier 14 with opposite change in the pressure in conduit 61, and accordingly reversible operation of motor 15 takes place.

It must be realized that the form of my invention illustrated is adapted for maintaining only one particular pressure value in conduit 61, and that particular output voltages of transformers 25, 44, and 100 and oscillator 10, as well as particular capacitances of capacitors 40 and 41, impedances of windings 42 and 43, and resistances of resistors 80, 81, and 82 can cooperate to regulate the pressure at only one value. If it is desired that the controlled pressure be regulable over a range, it is necessary that at least one of the components listed above (most conveniently the capacitance of capacitor 40) be made adjustable in addition to capacitor 41: this, however, is well within the ability of those skilled in the art after a perusal of the foregoing disclosure.

This application is a continuation of my copending application, Ser. No. 579,253, filed February 25, 1945, now forfeited, and assigned to the assignee of the present application.

Numerous objects and adantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts within the principles of the invention to the full extent indicated by the broad general meaning of the terms in which the following claims are expressed.

I claim as my invention:

1. In a device of the class described, in combination: means supplying a first periodic voltage of varying amplitude, including a carrier frequency component and a power frequency component; means independently supplying a second periodic voltage of fixed amplitude and phase, including at least a component of said power frequency; means deriving from said second voltage a voltage related to said power frequency component thereof; means deriving from said first voltage a voltage related to the power frequency component thereof; and means mechanically responsive to inequality between said derived voltages.

2. In a device of the class described, in combination: a first source of periodic voltage, of varying amplitude, including a carrier frequency component and a power frequency component; a second source of periodic voltage, of fixed amplitude and phase, including at least a component of said power frequency; an impedance device; means applying voltage from said second source across said device; means, including an asymmetrically conducting member, for deriving from said first source a voltage determined by the power frequency component of said first periodic voltage; and means mechanically responsive to inequality between said derived voltage and the voltage drop in a selected portion of said device due to said first applied voltage.

3. In a device of the class described, in combination: a first source of periodic voltage of varying amplitude, including a carrier frequency component and a power frequency component; a second source of periodic voltage of fixed amplitude and phase, including at least a component of said power frequency; an impedance device; means applying voltage from said second source across said device; means, including an asymmetrically conducting member, applying voltage from said first source across a variable portion of said device; and means mechanically responsive to inequality between said second applied voltage and the voltage drop in said portion of said device due to said first applied voltage.

4. In a device of the class described, in combination: a first source of periodic voltage, of varying amplitude, including a carrier frequency component and a power frequency component; a second source of periodic voltage, of fixed amplitude and phase, including at least a component of said power frequency; an impedance device; means applying voltage from said second source across said device; means, including an asymmetrically conducting member, for deriving from said first source a periodic voltage having a component of said power frequency whose amplitude varies with the amplitude of said first periodic voltage; and means mechanically responsive to inequality between said second periodic voltage and the voltage drop in a selected portion of said device due to said first applied voltage.

5. In a device of the class described, in combination: a first source of periodic voltage of varying amplitude, including a carrier frequency component and a power frequency component; a second source of periodic voltage of fixed amplitude and phase, including at least a component of said power frequency; an impedance device; means applying voltage from said second source across said impedance device; means, including an asymmetrically conducting member, for deriving from said first source a periodic voltage having a component of said power frequency whose amplitude varies with the amplitude of said first periodic voltage; and power frequency sensitive means mechanically responsive to inequality between said second periodic voltage and the voltage drop in a selected portion of said device due to said first applied voltage.

6. In a device of the class described, in combination: a first source of periodic voltage of variable amplitude, including a carrier frequency component and a power frequency component; means varying the amplitude of said first periodic voltage in response to change in a condition; a second source of periodic voltage of fixed amplitude and phase, including at least a component of said power frequency; means deriving from said second source a voltage related in amplitude to the power frequency component thereof; means deriving from said first source a voltage related in magnitude to the amplitude of the power frequency component thereof; and means mechanically responsive to inequality between said derived voltages.

7. In a device of the class described, in combination: means supplying a first periodic voltage of varying amplitude, including a carrier frequency component and a power frequency component; means independently supplying a second periodic voltage of fixed amplitude and phase, including at least a component of said power frequency; a voltage comparing impedance unit having an adjustable portion; means applying said second voltage across said impedance unit; means, including an asymmetrically conducting member, for deriving from said first voltage a voltage related to the amplitude of the power frequency component thereof; means mechanically responsive to inequality between said derived voltage and the voltage drop in a selected portion of said unit due to said first applied voltage, said last named means including a motor designed for energization with voltage of said power frequency; and means connecting said motor to said impedance unit for varying the size of said variable portion thereof, to make said derived voltage and said voltage drop equal.

8. In a device of the class described, in combination: a first source of periodic voltage of variable amplitude, including a carrier frequency component and a power frequency component; means varying the amplitude of said first periodic voltage in response to change in a condition; a second source of periodic voltage of fixed amplitude and phase, including at least a component of said power frequency; means deriving from said second source a voltage related in amplitude to the power frequency component thereof; means deriving from said first voltage a voltage related to the amplitude of the power frequency component thereof; and means, mechanically responsive to inequality between said derived voltages, for causing change in said condition.

9. In a device of the class described, in combination: a first source of periodic voltage of varying amplitude, including a carrier frequency component and a power frequency component; a second source of periodic voltage of fixed amplitude and phase, including at least a component of said power frequency; an impedance device having an adjustable portion; means applying voltage from said second source across said impedance device; means, including an asymmetrically conducting member, for deriving from said first source a voltage related to the amplitude of the power frequency component thereof; means mechanically responsive to inequality between said derived voltage and the voltage drop in a selected portion of said unit due to said first applied voltage, said last named means including a motor designed for energization with voltage of said power frequency and means connecting said motor to said impedance unit for varying the size of said variable portion thereof; and further means actuated by said motor for causing change in said condition.

10. In a device of the class described, in combination: a normally unbalanced electric bridge; means energizing said bridge with a complex alternating voltage including a carrier frequency component and a power frequency component; an impedance unit; means applying to said unit an alternating voltage substantially of only said power frequency; circuit means, including a nonlinear impedance member, connecting the output of said bridge in series with a portion of said impedance unit; an electric motor designed for energization with voltage of said power frequency; motor control means for energizing said motor; and means energizing said motor control means in accordance with inequality between said second applied voltage and the voltage drop in a selected portion of said unit due to said first applied voltage.

11. In a device of the class described, in combination: a normally balanced electric bridge having impedance arms and input and output circuits; means energizing said bridge with alternating voltage of a selected frequency; a motor; means reversibly energizing said motor in accordance with reversible unbalance of said bridge; means impressing a signal voltage, having an alternating component of said frequency, upon an impedance comprised in an arm of said bridge, whereby to cause voltage unbalance of said bridge; means varying the ratio of impedance arms of said bridge to cause equal and opposite voltage unbalance of said bridge; and means connecting said ratio varying means to said motor for actuation thereby.

12. In a device of the class described, in combination: first and second normally energized electric bridges having impedance arms and input and output circuits; means varying the impedance of an arm of one of said bridges whereby to affect the output of said bridge; an impedance member comprised in an arm of the other of said bridges; means impressing the output of said one bridge upon said impedance, whereby to affect the balance of said other bridge; and means varying the ratio between arms of said other bridge to rebalance said other bridge.

13. In a device of the class described, in combination: first and second normally energized electric bridges having impedance arms and input and output circuits; means varying the impedance of an arm of one of said bridges in response to change in a condition, whereby to affect the output of said bridge; an impedance member comprised in an arm of the other of said bridges, means impressing the output of said one bridge upon said impedance, whereby to affect the balance of said other bridge; a motor; means reversibly energizing said motor in accordance with reversible unbalance of said bridge; means varying the ratio between arms of said bridge to rebalance said bridge; means connecting said last named means with said motor for actuation thereby; and condition controlling means actuated by operation of said motor.

14. In a device of the class described, in combination: a plurality of impedance bridges having impedance arms and input and output circuits; a plurality of sources of alternating voltage; means energizing the input circuit of a first of said bridges from a first of said sources; means energizing the input circuit of a second of said bridges from a second of said sources; a first variable impedance member; means varying the impedance of said member in response to change in a condition; means connecting said member in an arm of said second bridge to vary the unbalance voltage thereof; means energizing one arm of said first bridge with said unbalance voltage, whereby to cause voltage unbalance of said first bridge; and means varying the ratio of impedance arms of said first bridge to cause equal and opposite voltage unbalance of said bridge, whereby said bridge is again brought to a condition of voltage equilibrium.

15. In a device of the class described, in combination: a plurality of impedance bridges having impedance arms and input and output circuits; a plurality of sources of alternating voltage; means energizing the input circuit of a first of said bridges from a first of said sources; means energizing the input circuit of a second of said bridges from a second of said sources; a first variable impedance member; means varying the impedance of said member in response to change in a condition; means connecting said member in an arm of said second bridge to vary the unbalance voltage thereof; means energizing one arm of said first bridge with said unbalance voltage, whereby to cause voltage unbalance of said first bridge; and means varying the ratio of impedance arms of said first bridge to cause equal and opposite voltage unbalance of said bridge, whereby said bridge is again brought to a condition of voltage equilibrium; a motor; means connecting said motor in the output circuit of said first bridge for reversible energization by reversible voltage unbalance thereof; means connecting said motor with said ratio varying means for actuation thereof; and control means actuated by said motor.

16. In a device of the class described, in combination: a plurality of impedance bridges having impedance arms and input and output circuits; a plurality of sources of alternating voltage having different frequencies; means energizing the input circuit of a first of said bridges from a first of said sources; means modulating the voltage from a second of said sources by voltage from said first source; means energizing the input circuit of a second of said bridges with said modulated voltage, a first variable impedance member; means varying the impedance of said member in response to change in a condition; means connecting said member in an arm of said second bridge to affect the balance thereof; means for demodulating said modulated voltage; means connecting said demodulating means in the output circuit of said second bridge; means energizing one arm of said first bridge with said demodulated voltage, whereby to cause voltage unbalance of said first bridge; and means varying the ratio of impedance arms of said second bridge, to cause equal and opposite voltage unbalance of said bridge, whereby said bridge is again brought to a condition of voltage equilibrium.

17. In a device of the class described, in combination: a plurality of impedance bridges having impedance arms and input and output circuits; a plurality of sources of alternating voltage having different frequencies; means energizing the input circuit of a first of said bridges from a first of said sources; means modulating the voltage from a second of said sources by voltage from said first source; means energizing the input circuit of a second of said bridges with said modulated voltage; a first variable impedance member; means varying the impedance of said member in response to change in a condition; means connecting said member in an arm of said second bridge to affect the balance thereof; means for demodulating said modulated voltage; means connecting said demodulating means in the output circuit of said second bridge; means energizing one arm of said first bridge with said demodulated voltage, whereby to cause voltage unbalance of said first bridge; means varying the ratio of impedance arms of said first bridge to cause equal and opposite voltage unbalance of said bridge, whereby said bridge is again brought to a condition of voltage equilibrium; a motor; means connecting said motor in the output circuit of said first bridge for reversible energization by reversible voltage unbalance thereof; means connecting said motor with said ratio varying means for actuation thereof; and control means actuated by said motor.

18. In a device of the class described, in combination: means supplying a first periodic voltage varying in response to a condition and including at least a carrier frequency component and a power frequency component; means independently supplying a second periodic voltage of fixed amplitude, including at least a component of said power frequency; a variable impedance unit for comparing a voltage applied thereto in a first fashion with a variable portion of a voltage applied thereto in a second fashion; means applying said power frequency components to said unit for comparison thereby; control means; and means causing operation of said control means when said components are unequal.

19. In a device of the class described, in combination: means supplying a first periodic voltage varying in response to a condition and including at least a carrier frequency component and a power frequency component; means independently supplying a second periodic voltage of fixed amplitude, including at least a component of said power frequency; a variable impedance unit for comparing a voltage applied thereto in a first fashion with a variable portion of a voltage applied thereto in a second fashion; means applying said power frequency components to said unit for comparison thereby; a motor designed for energization with voltage alternating at said power frequency; and means energizing said motor for operation when said components being compared are not equal.

20. In a device of the class described, in combination: means supplying a first periodic voltage varying in response to a condition and including at least a carrier frequency component and a power frequency component; means independently supplying a second periodic voltage of fixed amplitude, including at least a component of said power frequency; a variable impedance unit for comparing a voltage applied thereto in a first fashion with a variable portion of a voltage applied thereto in a second fashion; means applying said power frequency components to said unit for comparison thereby; a motor designed for energization with voltage alternating at said power frequency; means energizing said motor for operation when said components being compared are not equal; and means connecting said motor with said unit for adjustment thereof to vary the magnitude of said portion until said components being compared are equal.

CURTISS R. SCHAFER.

REFERENCES CITED

The following references are of record in the file of this patent:

UNITED STATES PATENTS

| Number | Name | Date |
| --- | --- | --- |
| 2,039,405 | Green et al. | May 5, 1936 |
| 2,183,725 | Seeley | Dec. 19, 1939 |